(12) United States Patent
Wofford et al.

(10) Patent No.: US 6,214,477 B1
(45) Date of Patent: Apr. 10, 2001

(54) MULTILAYER FILM WITH POLYOLEFIN AND POLYVINYL CHLORIDE

(75) Inventors: George D. Wofford, Duncan; William P. Roberts, Spartanburg, both of SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/118,605

(22) Filed: Jul. 17, 1998

(51) Int. Cl.[7] ............................. B65B 53/02; B32B 27/28
(52) U.S. Cl. ..................... 428/518; 428/520; 428/522; 428/34.9; 428/36.6; 428/910
(58) Field of Search ............................. 428/910, 35.4, 428/36.6, 36.7, 34.9, 518, 520, 522

(56) References Cited

U.S. PATENT DOCUMENTS

| | | | |
|---|---|---|---|
| 3,614,852 | 10/1971 | Buod | 53/30 |
| 4,156,749 | 5/1979 | Lustig et al. | 428/35 |
| 4,393,106 | 7/1983 | Maruhashi et al. | 428/35 |
| 4,409,286 | 10/1983 | Decroix | 428/332 |
| 4,457,960 | * 7/1984 | Newsome | 428/35 |
| 4,478,889 | 10/1984 | Maruhasi et al. | 427/230 |
| 4,486,378 | 12/1984 | Hirata et al. | 264/512 |
| 4,606,922 | * 8/1986 | Schirmer | 426/412 |
| 4,981,739 | * 1/1991 | Gibbons et al. | 428/34.2 |
| 5,094,921 | 3/1992 | Itamura et al. | 428/520 |
| 5,128,176 | 7/1992 | Schmidt | 427/140 |
| 5,358,582 | 10/1994 | Koshizuka et al. | 156/235 |
| 5,443,765 | 8/1995 | Yoshimura et al. | 264/22 |
| 5,466,748 | 11/1995 | Ikeda et al. | 525/57 |
| 5,532,028 | 7/1996 | Akao et al. | 428/35 |
| 5,679,422 | * 10/1997 | Lind et al. | 428/34.8 |
| 5,679,465 | * 10/1997 | Bekele | 428/474.4 |
| 5,685,128 | * 11/1997 | Chum et al. | 53/441 |
| 5,707,751 | * 1/1998 | Garza et al. | 428/515 |
| 5,803,130 | 9/1998 | Robben et al. | 138/137 |

OTHER PUBLICATIONS

"Ethylene Copolymers", Encyclopedia of Polymer Science and Engineering, vol. 6, pp 421–422, 1985.*

* cited by examiner

Primary Examiner—Paul Thibodeau
(74) Attorney, Agent, or Firm—Mark B. Quatt

(57) ABSTRACT

A film includes a first layer including polyvinyl chloride; and a second layer including a material such as anhydride functionalized polyolefin, ethylene/vinyl acetate copolymer having a vinyl acetate content of between 10% and 35%, ethylene/alkyl acrylate copolymer having an alkyl acrylate content of between 10% and 30%, ethylene/alkyl methacrylate copolymer having an alkyl methacrylate content of between 10% and 30%, ethylene/acrylic acid copolymer having an acrylic acid content of between 10% and 30%, ethylene/methacrylic acid copolymer having a methacrylic acid content of between 10% and 30%, and ionomer. A layer of polyolefin, and/or an additional layer including any of the materials of the second layer, or polyvinyl chloride, can be optionally included in a film of the invention.

17 Claims, 2 Drawing Sheets

MULTILAYER FILM WITH POLYOLEFIN AND POLYVINYL CHLORIDE

FIELD OF THE INVENTION

The present invention relates to a thermoplastic film containing polyolefin and polyvinyl chloride, which film can be utilized to package a wide variety of items.

BACKGROUND OF THE INVENTION

The present invention is directed to a new and useful film. Films, and especially heat shrinkable films are well known for many packaging applications.

Examples of such films are the polyolefinic films supplied commercially by Cryovac, Inc. These films have proven to be very useful in pack- aging applications where high shrink, good optics, impact resistance, tear initiation and tear propagation resistance are needed. Films of this type are disclosed in U.S. Pat. Nos. 4,551,380 and 4,643,943, both to Schoenberg, incorporated herein by reference in their entirety.

Polyvinyl chloride (hereinafter "PVC") films are also widely used in packaging applications.

PVC films exhibit good elastic recovery, high modulus, and low shrink tension, but poor sealability, and poor tear resistance. They also carbonize during a trim sealing process.

It would be desirable to provide a film having the good sealaibility and tear resistance properties of polyolefinic films, but with the good elastic recovery, high modulus, and low shrink tension of PVC films.

SUMMARY OF THE INVENTION

In a first aspect, a multilayer film comprises a first layer, having two major surfaces, comprising polyvinyl chloride; and a second layer, adhered to a first major surface of the first layer, comprising a material selected from the group consisting of anhydride functionalized polyolefin, ethylene/vinyl acetate copolymer having a vinyl acetate content of between 10% and 35% by weight of the ethylene/vinyl acetate copolymer, ethylene/alkyl acrylate copolymer having an alkyl acrylate content of between 10% and 30% by weight of the ethylene/alkyl acrylate copolymer, ethylene/alkyl methacrylate copolymer having an alkyl methacryl- ate content of between 10% and 30% by weight of the ethylene/alkyl methacrylate copolymer, ethylene/acrylic acid copolymer having an acrylic acid content of between 10% and 30% by weight of the ethylene/acrylic acid copolymer, ethylene/methacrylic acid copolymer having a methacrylic acid content of between 10% and 30% by weight of the ethylene/methacrylic acid copolymer, and ionomer. Optionally, the film further comprises a third layer, adhered to a second major surface of the first layer, comprising any of the materials of the second layer.

In a second aspect, a multilayer film comprises a core layer, having two major surfaces, comprising a material selected from the group consisting of anhydride functionalized polyolefin, ethylene/vinyl acetate co- polymer having a vinyl acetate content of between 10% and 35% by weight of the ethylene/vinyl acetate copolymer, ethylene/alkyl acrylate copolymer having an alkyl acrylate content of between 10% and 30% by weight of the ethylene/alkyl acrylate copolymer, ethylene/alkyl methacrylate copolymer having an alkyl methacrylate content of between 10% and 30% by weight of the ethylene/alkyl methacrylate copolymer, ethylene/acrylic acid copolymer having an acrylic acid content of between 10% and 30% by weight of the ethylene/acrylic acid copolymer, ethylene/methacrylic acid copolymer having a methacrylic acid content of between 10% and 30% by weight of the ethylene/methacrylic acid copolymer, and ionomer; a first outer layer, adhered to a first major surface of the core layer, comprising polyvinyl chloride; and a second outer layer, adhered to a second major surface of the core layer, comprising polyolefin or polyvinyl chloride. The first outer layer comprising polyvinyl chloride can optionally have adhered to it, a fourth layer comprising any of the materials disclosed for the core layer.

In a third aspect, a multilayer film comprises a core layer, having two major surfaces, comprising polyvinyl chloride; two intermediate layers, each adhered to a respective major surface of the core layer, comprising a material selected from the group consisting of anhydride functionalized polyolefin, ethylene/vinyl acetate copolymer having a vinyl acetate content of between 10% and 35% by weight of the ethylene/vinyl acetate copolymer, ethylene/alkyl acrylate copolymer having an alkyl acrylate content of between 10% and 30% by weight of the ethylene/alkyl acrylate copolymer, ethylene/alkyl methacrylate copolymer having an alkyl methacrylate content of between 10% and 30% by weight of the ethylene/alkyl methacrylate copolymer, ethylene/acrylic acid copolymer having an acrylic acid content of between 10% and 30% by weight of the ethylene/acrylic acid copolymer, ethylene/methacrylic acid copolymer having a methacrylic acid content of between 10% and 30% by weight of the ethylene/methacrylic acid copolymer, and ionomer; and two outer layers, each adhered to a major surface of a respective intermediate layer, comprising polyolefin.

DEFINITIONS

"Anhydride functionalized polyolefin" (ahPO) herein refers to any form of anhydride functionality, such as the anhydride of maleic acid, itaconic acid, etc., grafted onto a polyolefin or copolymerized with a polyolefin; and optionally blended with one or more polyolefins.

"Core layer" herein refers to a central layer of a multi-layer film.

"Intermediate layer" herein refers to a layer of a multi-layer film which is neither a core layer nor an outer layer.

"Ionomer" herein refers to an ionized copolymer of ethylene and a vinyl monomer with an acid group, such as copolymers of acrylic or methacrylic acid, in which the ionization is a result of replacing protons with metal ions on a portion of the acid groups on the polymer.

"Outer layer" herein refers to what is typically an outermost, surface layer of a multi-layer film, although additional layers and/or films can be optionally adhered to it.

"Polymer" herein refers to homopolymer, copolymer, terpolymer, etc. "Copolymer" herein refers to copolymer, terpolymer, etc.

All compositional percentages used herein are calculated on a "by weight" basis.

"Polyolefin" (PO) herein refers to the class or group of thermoplastic polymers derived from simple olefins, such as polyethylene (e.g. low density polyethylene and high density polyethylene), polypropylene, polybutene, etc. and includes copolymers such as ethylene/alpha-olefin copolymer; ethylene/vinyl acetate copolymer; ethylene/alkyl acrylate copolymer, ethylene/alkyl methacrylate copolymer, propylene/ethylene copolymer, and ionomer.

"Ethylene/alpha-olefin copolymer" (EAO) refers to such heterogeneous materials as linear medium density polyethylene (LMDPE), linear low density polyethylene (LLDPE), and very low and ultra low density polyethylene (VLDPE and ULDPE); as well as homogeneous polymers (HEAO) such as TAFMER™ ethylene/alpha olefin copolymers supplied by Mitsui Petrochemical Corporation and metallocene-catalyzed polymers such as EXACT™ materials supplied by Exxon, AFFINITY™ resins supplied by Dow Chemical Company, and ENGAGE™ resins supplied by DuPont Dow Elastomers. These materials generally include copolymers of ethylene with one or more comonomers selected from $C_4$ to $C_{10}$ alpha-olefins such as butene-1 (i.e., 1-butene), hexene-1, octene-1, etc.

"Polyvinyl chloride" is defined herein as a polymer made by the catalytic polymerization of vinyl chloride. "Polyvinyl chloride" also includes copolymers that contain at least 50% vinyl chloride. Stabilizers, and plasticizers such as epoxidized vegetable oil, dialkyl adipate, and dialkyl phthalate, are commonly used and are herein included when referring to "polyvinyl chloride".

"Heat shrinkable" herein refers to a material which, when heated to a temperature of 180° F., will have a free shrink of 5% or greater, more preferably 10% or greater, in at least one linear direction, as measured by ASTM D 2732.

"MD" herein refers to machine direction or longitudinal direction.

"TD" herein refers to transverse direction or cross direction.

"EVA" herein refers to ethylene/vinyl acetate copolymer.

BRIEF DESCRIPTION OF THE DRAWINGS

The invention may be further understood with reference to the drawings wherein.

DETAILED DESCRIPTION OF THE INVENTION

Figure 1:
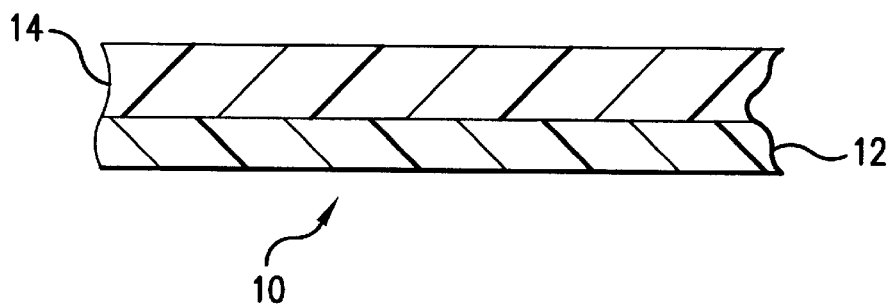
FIGS. 1 through 4 are schematic cross-sections of various embodiments of a film of the present invention.

Referring to FIG. 1, a multilayer film 10 is shown, having first layer 12 and second layer 14.

First layer 12 comprises any of anhydride functionalized polyolefin; ethylene/vinyl acetate copolymer having a vinyl acetate content of between 10% and 35% by weight, preferably between 13% and 30% by weight, of the ethylene/vinyl acetate copolymer; ethylene/alkyl acrylate copolymer having an alkyl acrylate content of between 10% and 30% by weight of the ethylene/alkyl acrylate copolymer; ethylene/alkyl methacrylate copolymer having an alkyl methacrylate content of between 10% and 30% by weight of the ethylene/alkyl methacrylate copolymer; ethylene/acrylic acid copolymer having a acrylic acid content of between 10% and 30% by weight of the ethylene/acrylic acid copolymer; ethylene/methacrylic acid copolymer having a methacrylic acid content of between 10% and 30% by weight of the ethylene/methacrylic acid copolymer; or ionomer. Blends of any of these materials can also be used. These materials in any combination preferably comprise at least 50%, more preferably at least 70%, and most preferably at least 90% of the first layer, and can comprise 100% of the first layer.

Second layer 14 comprises polyvinyl chloride.

Other materials can be blended with the materials of the first layer 12. These include ethylene/alpha olefin copolymer or other polymeric materials, slip and antiblock agents, stabilizers, crosslinking enhancers or inhibitors, and the like. A practical limit on the use of such materials in the first layer 12 is the degree to which interlaminar adhesion between the first layer 12, and the second layer 14, can be at least minimally maintained for commercial use.

Figure 2:
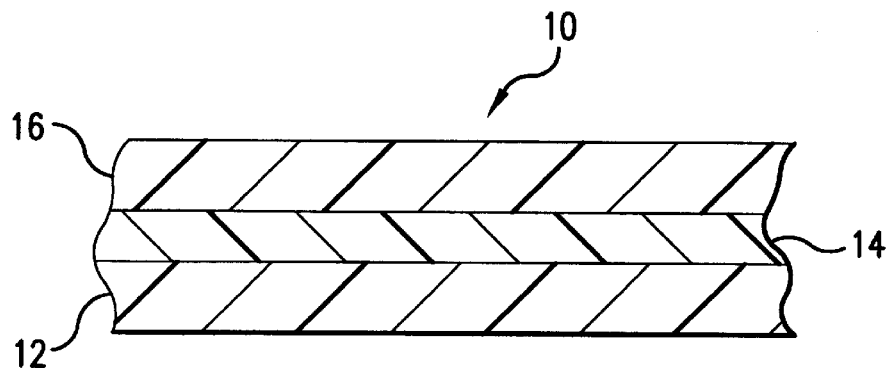

FIG. 2 shows in a first embodiment a multilayer film with first outer layer 12, core layer 14, and second outer layer 16. Layers 12 and 14 can comprise any of the materials disclosed above for layers 12 and 14 of FIG. 1. Layer 16 can comprise any of the materials disclosed for layer 12 of FIG. 1. Although the two outer layers 12 and 16 are preferably identical in composition, they can be different from each other, within the parameters defined herein.

In an alternative embodiment, FIG. 2 represents a film in which core layer 14 can comprise any of the materials disclosed above for layer 12 of FIG. 1. Layer 12 comprises polyvinyl chloride. Layer 16 comprises a polyolefin or polyvinyl chloride.

Figure 3:
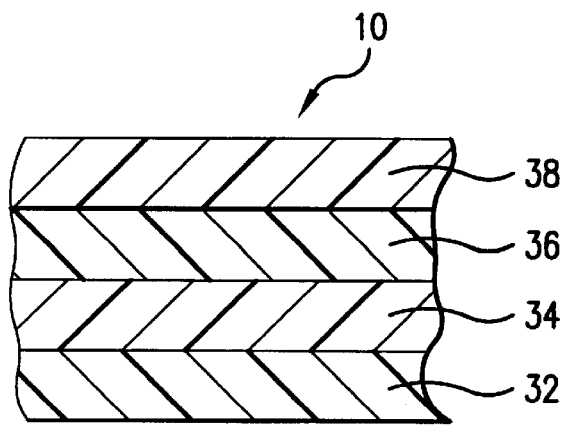

Referring to FIG. 3, the film comprises layer 34 comprising poly- vinyl chloride; layers 32 and 36 each comprising any of the materials disclosed for layer 12 of FIG. 1; and layer 38 comprising a polyolefin.

Figure 4:
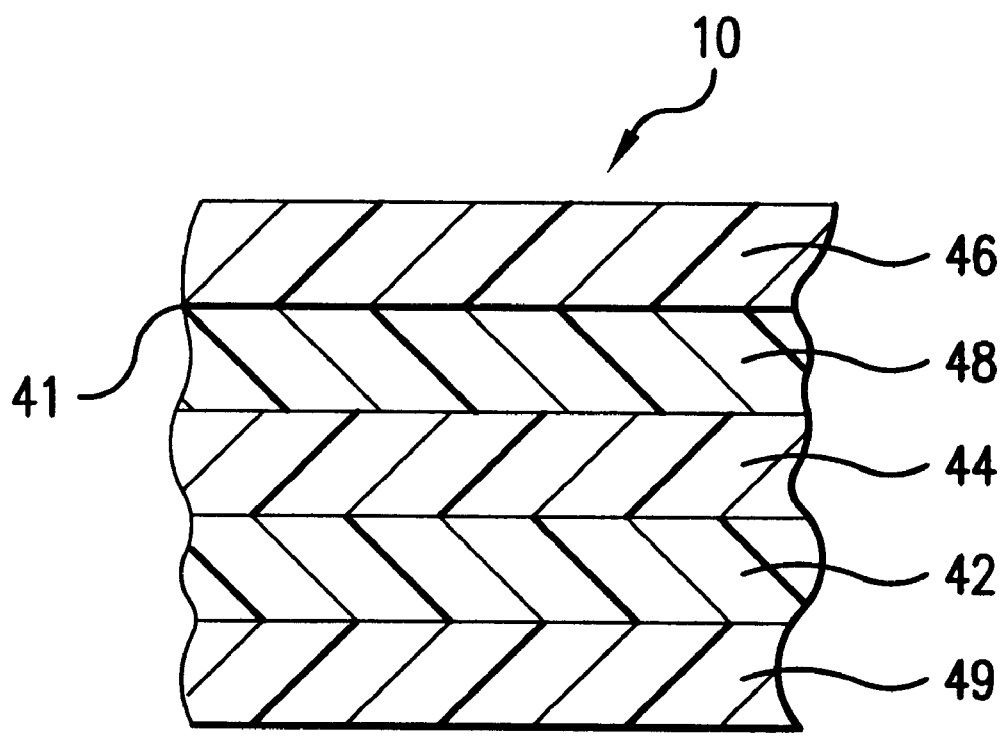

Referring to FIG. 4, the film comprises a core layer 44, two intermediate layers 42 and 48, and two outer layers 49 and 46. Outer layers 49 and 46 are preferably surface layers.

Core layer 44 comprises polyvinyl chloride.

Intermediate layers 49 and 46 comprise any of the materials recited above for layer 12 of FIG. 1.

Outer layers 49 and 46 comprise a polyolefin. Preferred is ethylene/alpha-olefin copolymer, propylene/ethylene copolymer, ethylene/vinyl acetate copolymer, and/or ionomer.

In the five layer embodiment, the outer layers preferably differ in composition from each other, although they can be the same; the inter- mediate layers differ in composition from each other, although they can be the same; and the outer layers preferably differ in composition from the intermediate layers.

The invention can be further understood by reference to the examples and physical properties given below. These films can be made by a conventional flat or tubular cast coextrusion, or other suitable process such as a blown film process. If desired for a given end use, these films can be oriented by trapped bubble, tenterframe, or other suitable process. They can thereafter optionally be annealed. Films of the present invention are preferably heat shrinkable, although they can be non-heat shrinkable as well. Films of the invention can optionally be crosslinked by chemical means, or physical means such as the use of actinic radiation, preferably electron beam irradiation. Final film thicknesses can vary, depending on process, end use application, etc. Typical thicknesses are between 0.1 and 10 mils; preferably between 0.2 and 5 mils, more preferably between 0.3 mils and 3 mils, and most preferably 0.4 and 2 mils.

If oriented, the film can be oriented either monoaxially or biaxially. Orientation ratios preferably range from 2:1 to 10:1 in each direction, more preferably 2.0:1 to 5:1 in one or both directions.

Table 1 identifies the materials used in the examples. The remaining tables describe the properties of films made with these materials.

EXAMPLES

TABLE 1

| MATERIAL | TRADENAME | SOURCE |
| --- | --- | --- |
| $PVC_1$ | Reynolds ™ 5044 film* | Reynolds |
| $PVC_2$ | PVC 83-580E** | Unichem |
| $EVA_1$ | Elvax ™ 3175 | DuPont |
| $EVA_2$ | Escorene ™ LD-720.92 | Exxon |
| $EVA_3$ | Escorene ™ LD-705.15 | Exxon |
| $EMA_1$ | EMAC ™SP 1305 | Chevron |
| $PO_1$ | Attane ™ 4201 | Dow |
| $PO_2$ | Dowlex ™2045.03 | Dow |
| $PO_3$ | Dowlex ™2244A | Dow |
| $PO_4$ | Eltex ™ P KS 409 | Solvay |

*hot pressed, served as source of resin.

$PVC_1$=polyvinyl chloride resin derived from commercial film, as stated above.

$PVC_2$=polyvinyl chloride resin with approximately 13% by weight of dioctyl adipate and approximately 2% by weight or epoxidized soybean oil plasticizers.

$EVA_1$=ethylene/vinyl acetate copolymer with 28%, by weight of the EVA, of vinyl acetate monomer.

$EVA_2$=ethylene/vinyl acetate copolymer with 19%, by weight of the EVA, of vinyl acetate monomer.

$EVA_3$=ethylene/vinyl acetate copolymer with 13%, by weight of the EVA, of vinyl acetate monomer.

$EMA_1$=ethylene/methyl acrylate copolymer with 20%, by weight of the EMA, of methyl acrylate monomer.

$PO_1$=ethylene/1-octene copolymer with a density of 0.912 grams/cc, and a melt flow index of 1.0.

$PO_2$=ethylene/1-octene copolymer with a density of 0.920 grams/cc, and 6.5%, by weight of the copolymer, of 1-octene monomer, and a melt flow index of 1.1.

$PO_3$=ethylene/1-octene copolymer with a density of 0.916 grams/cc, and a melt flow index of 3.3.

$PO_4$=propylene/ethylene copolymer with 3.2% ethylene by weight of the resin.

The data below demonstrates the benefits of a thermoplastic film containing polyolefin and polyvinyl chloride.

Example 1

A workable lab scale orientation process for purposes of evaluating the invention was determined empirically by using a T.M. Long Bi-axial Film Stretcher with modifications to permit cooling of the film. Compression-molded plaques of single- and multi-layer resin formulations were stretched.

Compression Molded Plaque Preparation

Mono-layer PVC was made by pressing cut up pieces of Reynolds 5044 1.5 mil (150 gauge) thick film at 10,000 pounds pressure on a small Carver™ Press with 12 mil shims and a 425° F. platen temperature. Dwell time was kept to a minimum to minimize discoloration of the PVC.

Multi-layer pressed film prototypes were made by pressing mono-layers of each resin (6 mils or greater in thickness), then cutting disks from each, assembling a stack of these, and pressing down to final thickness (10–12 mils) in the Carver press as for the mono-layer material.

Inter-ply adhesion to PVC was tested on the pressed plaques. Adhesion was poor for EVA with a vinyl acetate content of less than 10 weight percent, and LLDPE. As tie layers, $EVA_2$, $EMA_1$, and EVA, were screened. Based on manually peeling apart the film layers, the best inter-ply adhesion was obtained with $EVA_1$, so this resin was used as the tie layer. $EMA_1$ exhibited a level of interply adhesion not as good as $EVA_1$, but better than $EVA_2$. The sealant layers used were $PO_1$ and $PO_2$. Under the stretching conditions used for PVC (see below), the $PO_1$ was the best sealant layer with respect to orientability. Thus, the multilayer structure produced (Example 1) had the structure:

$PO_1/EVA_1/PVC/EVA_1/PO_1$.

Stretched Film

Conditions for stretching PVC on the T.M. Long Biaxial Film Stretcher were arrived at by trial and error, comparing shrink properties of the resulting film samples to the commercial PVC shrink film (Reynolds 5044 150 gauge). The following conditions were adopted:

Rack (Orientation) Ratio: 2.6 MD×2.6 TD.

Sample Temperature: 210° F.

Stretch Rate: 20 inches/second.

The T.M. Long Biaxial Film Stretcher had been modified to permit cooling of the samples with ambient air at the end of the stretch. Thus-prepared samples were immersed in warm water (120° F.) for about 8 seconds to anneal the samples prior to testing. Samples stretched this way showed similar shrink tension properties compared with the commercial Reynolds PVC film, and somewhat higher free shrink. Multi-layer stretched films were prepared from the multi-layer pressed films by this same process. They were checked for final layer gauge. The results are as follows for Example 1 after orientation:

TABLE 2

| | Layer 1 | Layer 2 | Layer 3 | Layer 4 | Layer 5 |
| --- | --- | --- | --- | --- | --- |
| Resin | $PO_1$ | $EVA_1$ | PVC | $EVA_1$ | $PO_1$ |
| Target (mils) | 0.17 | 0.17 | 0.87 | 0.17 | 0.17 |
| Actual (mils) | 0.54–0.65 | 0.08–0.10 | 0.32–0.38 | 0.10–0.10 | 0.52–0.66 |

The sealant layer was much thicker than target value, and the core much thinner, meaning that there was not as much PVC in these films as was desired. This was the result of reduced flow in the sealant during pressing of the multi-layer sample. Because of this, we can assume that bulk properties of these films are less similar to those of PVC than they could be with more realistic layer ratios.

Testing of Sealability

One inch wide test strips were cut from the stretched film, and sealed on a hot bar sealer at 350° F. with 2 seconds dwell time and 40 psi pressure. Due to shrinkage, the final seal area width was less than 1, for these samples. As relates to aspects of the test not explicitly cited above, seal strength was tested on an Instron™ tester according to ASTM F-88.

The D 940 control is an oriented, heat shrinkable three layer film with outer layers of a blend of ethylene/alpha-olefin copolymers, and a core layer of a blend of ethylene/vinyl acetate copolymer and ethylene/acrylate copolymer. The D-955 control is an oriented, heat shrinkable three layer film with outer layers of a blend of ethylene/alpha-olefin copolymers and ethylene/vinyl acetate copolymer, and a core layer of ethylene/alpha olefin copolymer.

TABLE 3

| | Reynolds 5044 Control | D-940 Control | D-955 Control | Mono-Ply PVC | Oriented Example 1 |
|---|---|---|---|---|---|
| Thickness (mils) | 1.5 | 0.6 | 0.75 | 1.5 | 1.5 |
| Film Direction | MD | MD | MD | N/A | N/A |
| Seal Strength (lbs/in) | 1.5 +/− 1.0 | 3.1 +/− 0.3 | 3.6 +/− 0.3 | Did not seal | 3.6 +/− 1.0 |

The data in Table 3 indicate a significant improvement in sealability of the Example 1 structure compared with the mono-ply PVC and the Reynolds 5044 control, and similar to the non-PVC control films. Preferred films of the invention have a seal strength of between 2.6 and 4.6 pounds/inch.

Shrink Tension Testing

Shrink tension curves were tested on half-inch strips of each film, using a shrink tension sample holder as defined in ASTM D 2838, whereby the temperature of the heating medium (silicone oil) is continually increased at about 12° F/min., then the temperature and stress at which peak shrink tension occurs is read from the curve.

TABLE 4

| | Reynolds 5044 Control | D-940 Control | D-955 Control | Mono-Ply PVC | Oriented Example 1 |
|---|---|---|---|---|---|
| Thickness (mils) | 1.5 | 0.6 | 0.75 | 1.5 | 1.5 |
| Film Direction | MD | MD | MD | N/A | N/A |
| Peak Shrink Tension (psi) | 182 | 306 | 425 | 185 | 175 |
| Peak Temp. (F)* | 204 | 199 | 231 | 199 | 208 |

*temperature at which peak shrink tension occurred.

The data of Table 4 show that the low peak shrink tension of PVC shrink film is matched in the structure of Example 1. Films of the invention have a preferred peak shrink tension of between 100 and 300 psi, more preferably between 100 and 200 psi.

Free Shrink Testing

Free shrink was tested at three temperatures by immersing strips of film in a hot water bath (or hot silicone oil for temperatures above the boiling point of water) for eight seconds, then determining the change in length.

TABLE 5

| | Reynolds 5044 Control | D-940 Control | D-955 Control | Mono-Ply PVC | Oriented Example 1 |
|---|---|---|---|---|---|
| Thickness (mils) | 1.5 | 0.6 | 0.75 | 1.5 | 1.5 |
| Film Direction | MD | MD | MD | N/A | N/A |
| % Free shrink @ 185F | 24 | 21 | 10 | 38 | 25 |
| % Free shrink @ 203F | 29 | 42 | 15 | 43 | 40 |
| % Free shrink @ 220F | 31 | 55 | 25 | 47 | 51 |

It is apparent that the PVC films exhibit a large portion of their maximum free shrink at lower temperature. This "low temperature shrink" characteristic is present in the film of Example 1 as well, though to a reduced degree.

Modulus Testing

Using ASTM D 882, the tensile modulus of the different films was determined on strips of film each having a length of 2 inches, and a width of 0.5 inches.

TABLE 6

|  | Reynolds 5044 Control | D-940 Control | D-955 Control | Mono-Ply PVC | Oriented Example 1 |
|---|---|---|---|---|---|
| Thickness (mils) | 1.5 | 0.6 | 0.75 | 1.5 | 1.5 |
| Film Direction | MD | MD | MD | N/A | N/A |
| Tensile Modulus (psi) | 208,000 +/− 16,000 | 31,000 +/− 2,000 | 66,000 +/− 2,000 | 192,000 | 90,000 |

These results show that a desirable higher modulus is obtained with the film of Example 1 (vs. D940 and D955 controls) even though the surrounding polyolefin layers account for most of the structure and they themselves are very soft. The unique ability of PVC to afford low shrink tension with high modulus is present in the film of Example 1.

Tear Strength

A final test was performed to quantify an observed improvement in tear strength for the film of Example 1 vs. the mono-ply PVC structure. This was done by using the standard tear propagation test (ASTM D 1938) on the Instron™ tester, working with 0.5 inch samples.

TABLE 7

|  | Mono-Ply PVC | Oriented Example 1 |
|---|---|---|
| Thickness (mils) | 1.5 | 1.5 |
| Film Direction | N/A | N/A |
| Tear propagation (gms) | 7.6 | 38.5 |

This data indicate a very significant improvement in tear resistance for the multi-ply films vs. mono-ply PVC. D-940 and D-955 show intermediate values between these two extremes, according to product data sheets.

The film of the present invention thus shows desirable aspects of PVC (low shrink tension, elastic recovery, high modulus) and desirable aspects of polyolefins (seal strength, tear resistance) by having a polyolefin as a sealant, preferably with a tie layer such as EVA with a vinyl acetate content of between 10% and 35% by weight of the EVA, in combination with a core layer of PVC.

Example 2

A film is made like that of Example 1, but in which the sealant layer is an ethylene/alpha olefin copolymer with a melt index of 5.

Example 3

A film is made like that of Example 1, but in which the sealant layer is an ethylene/alpha olefin copolymer with a melt index of 10.

Example 4

A film is made like that of Example 1, but having the structure:

PO/ahPO/PVC/ahPO/PO

Example 5

A film is made like that of Example 1, but having the structure:

PO/ahPO/PVC/EVA$_1$/PO

Example 6

A film is made as described above for Example 1, but having the structure:

ahPO/PVC/ahPO

Example 7

A film is made as described above for Example 1, but having the structure:

EVA$_1$/PVC/EVA$_1$

Example 8

A film is made as described above for Example 1, but having the structure:

ahPO/PVC/EVA$_1$

Additional examples are made as described for Example 1, but having the structures described in Table 8.

TABLE 8

| Example | Structure |
|---|---|
| 9 | EVA$_2$/PVC/EVA$_2$ |
| 10 | EVA$_3$/PVC/EVA$_3$ |
| 11 | EVA$_1$/PVC/EVA$_3$ |
| 12 | AhPO/PVC/EVA$_2$ |
| 13 | AhPO/PVC/EVA$_3$ |
| 14 | PO/EVA$_2$/PVC/EVA$_2$/PO |
| 15 | PO/EVA$_3$/PVC/EVA$_3$/PO |
| 16 | PO/ahPO/PVC/EVA$_2$/PO |
| 17 | PO/ahPO/PVC/EVA$_3$/PO |

Coextruded Tape Samples

The following multilayer materials were prepared by coextrusion as a 5 to 6-inch wide flat sheet on a lab-scale coextrusion apparatus with a chill roll film wind-up assembly (Randcastle, Inc.):

TABLE 9

| Film Examples | Layer 1/ Thickness(mils) | Layer 2/ Thickness(mils) | Layer 3/ Thickness(mils) | Layer 4/ Thickness(mils) | Layer 5/ Thickness(mils) |
|---|---|---|---|---|---|
| 18 | PO$_3$/1.7 | EVA$_1$/1.0 | PVC$_2$/4.0 | EVA$_1$/0.9 | PO$_3$/1.9 |
| 19 | PO$_3$/0.9 | EVA$_1$/1.1 | PVC$_2$/5.3 | EVA$_1$/0.9 | PO$_3$/1.0 |
| Comp. 1 | PO$_3$/1.5 | EVA$_1$/1.1 | PO$_2$/4.5 | EVA$_1$/1.1 | PO$_3$/1.8 |
| 20 | PO$_4$/2.3 | EVA$_1$/0.8 | PVC$_2$/2.6 | EVA$_1$/0.9 | PO$_4$/2.6 |
| 21 | PO$_4$/2.2 | EVA$_1$/0.8 | PVC$_2$/4.4 | EVA$_1$/0.8 | PO$_4$/2.2 |
| Comp. 2 | PO$_4$/2.3 | EVA$_1$/0.8 | PO$_2$/3.8 | EVA$_1$/0.8 | PO$_4$/2.3 |

Films 18, 19, and Comp. 1 were irradiated with a 500 KeV electron source at a dose of 25–30 kGrays. These samples are designated as 18 EB, 19 EB, and Comp. 1 EB, respectively.

Stretched Films

All of the coextruded samples in Table 9 were stretched at the following conditions on the TM Long Biaxial Film Stretcher as described in Example 1, except that warm water immersion annealing was omitted:

Rack (Orientation) Ratio: 2.6 MD×2.6 TD.

Sample Temperature: 220° F.

Stretch Rate: 20 inches/second.

Stretched samples were then tested for shrink tension peak values and free shrink at 220° F. in the machine direction as described in Example 1. Results are shown in Table 10.

TABLE 10

| Stretched Sample | 18 | 18 EB | 19 | 19 EB | Comp 1 | Comp 1 EB | 20 | 21 | Comp 2 |
|---|---|---|---|---|---|---|---|---|---|
| Thickness (mils)[1] | 1.7 | 1.7 | 1.7 | 1.7 | 1.7 | 1.7 | 1.7 | 1.7 | 1.7 |
| Peak Shrink Tension (psi) | — | 145 | — | 265 | — | 160 | 215 | 198 | 210 |
| Peak Temp. (F)[2] | — | 210 | — | 205 | — | 230 | 240 | 235 | 235 |
| Free Shrink @ 220F (%) | 51 | 49 | 48 | 53 | 24 | 20 | 27 | 28 | 8 |

[1]highly variable (+/− 25%)
[2]temperature at which peak shrink tension occurred.

These data show that it is possible to obtain low shrink tension without the use of PVC in the core layer (the comparative film examples Comp. 1 EB and Comp. 2 show this effect), particularly when a low orientation ratio is used as in these examples. However, the shrinkage of the control films is seen to be reduced relative to that of the experimental films. Thus, in end uses where a combination of relatively low shrink tension and relatively high free shrink is needed, films of the present invention offer great benefit compared with non-PVC films.

Preferred film of the present invention has a seal strength, when sealed to itself, of between 2 and 10 pounds/inch.

Preferred film of the present invention has, in oriented embodiments of the invention, a shrink tension of between 100 and 300 psi in at least one of the machine and transverse directions at 200° F.

Preferred film of the present invention has, in oriented embodiments of the invention, a free shrink of between 25% and 65%, more preferably between 30% and 65%, most preferably between 35% and 65%, in at least one of the machine and transverse directions at 220° F.

Preferred film of the present invention has a tensile modulus of between 70,000 and 200,000 psi in at least one of the machine and transverse directions Preferred film of the present invention has, in oriented embodiments of the invention, a tear propagation of between 20 and 50 grams in at least one of the machine and transverse directions.

Preferred film of the present invention has an oxygen transmission rate of at least 100 cc/square meter-day-atmosphere in accordance with ASTM D 3985, more preferably between 100 and 50,000 cc/square meter-day-atmosphere.

It is to be understood that variations of the present invention as disclosed can be made without departing from the scope of the invention, which is not limited to the specific embodiments and examples disclosed herein, but extends to the claims presented below. For example, a film of the invention can comprise an A/B/A structure comprising a core layer comprising any of the materials recited for first layer 12 of FIG. 1, and two outer layers each comprising polyvinyl chloride.

Example 22

A film having the structure PVC$_1$/EVA$_1$/PVC$_1$ is made by the process disclosed for example 1.

What is claimed is:

1. A heat shrinkable multilayer film comprising a) a first layer, having two major surfaces, comprising polyvinyl chloride; and b) a second layer, adhered to a first major surface of the first layer, comprising a material selected from the group consisting of:
   i) anhydride functionalized polyolefin,
   ii) ethylene/vinyl acetate copolymer having a vinyl acetate content of between 10% and 35% by weight of the ethylene/vinyl acetate copolymer,
   iii) ethylene/alkyl acrylate copolymer having an alkyl acrylate content of between 10% and 30% by weight of the ethylene/alkyl acrylate copolymer, iv) ethylene/alkyl methacrylate copolymer having an alkyl methacrylate content of between 10% and 30% by weight of the ethylene/alkyl methacrylate copolymer, v) ethylene/acrylic acid copolymer having an acrylic acid content of between 10% and 30% by weight of the ethylene/acrylic acid copolymer, vi) ethylene/methacrylic acid copolymer having a methacrylic acid content of between 10% and 30% by weight of the ethylene/methacrylic acid copolymer, and vii) ionomer;

wherein the film has a shrink tension of between 100 and 300 psi in at least one of the machine and transverse directions at 200° F., and a free shrink of between 25% and 65% in at least one of the machine and transverse directions at 220° F.

2. The film of claim 1, further comprising a third layer, adhered to a second major surface of the first layer, comprising a material selected from the group consisting of:

i) anhydride functionalized polyolefin, ii) ethylene/vinyl acetate copolymer having a vinyl acetate content of between 10% and 35% by weight of the ethylene/vinyl acetate copolymer, iii) ethylene/alkyl acrylate copolymer having an alkyl acrylate content of between 10% and 30% by weight of the ethylene/alkyl acrylate copolymer, iv) ethylene/alkyl methacrylate copolymer having an alkyl methacrylate content of between 10% and 30% by weight of the ethylene/alkyl methacrylate copolymer, v) ethylene/acrylic acid copolymer having an acrylic acid content of between 10% and 30% by weight of the ethylene/acrylic acid copolymer, vi) ethylene/methacrylic acid copolymer having a methacrylic acid content of between 10% and 30% by weight of the ethylene/methacrylic acid copolymer, and vii) ionomer.

3. The film of claim 1 wherein the anhydride functionalized polyolefin comprises an anhydride of maleic acid grafted onto a polyolefin.

4. The film of claim 1 wherein the film is crosslinked.

5. A heat shrinkable multilayer film comprising a) a core layer, having two major surfaces, comprising a material selected from the group consisting of:

i) anhydride functionalized polyolefin, ii) ethylene/vinyl acetate copolymer having a vinyl acetate content of between 10% and 35% by weight of the ethylene/vinyl acetate copolymer, iii) ethylene/alkyl acrylate copolymer having an alkyl acrylate content of between 10% and 30% by weight of the ethylene/alkyl acrylate copolymer, iv) ethylene/alkyl methacrylate copolymer having an alkyl methacrylate content of between 10% and 30% by weight of the ethylene/alkyl methacrylate copolymer, v) ethylene/acrylic acid copolymer having an acrylic acid content of between 10% and 30% by weight of the ethylene/acrylic acid copolymer, vi) ethylene/methacrylic acid copolymer having a methacrylic acid content of between 10% and 30% by weight of the ethylene/methacrylic acid copolymer, and vii) ionomer;

b) a first outer layer, adhered to a first major surface of the first layer, comprising polyvinyl chloride; and c) a second outer layer, adhered to a second major surface of the first layer, comprising polyolefin or polyvinyl chloride;

wherein the film has a shrink tension of between 100 and 300 psi in at least one of the machine and transverse directions at 200° F., and a free shrink of between 25% and 65% in at least one of the machine and transverse directions at 220° F.

6. The film of claim 5 further comprising a fourth layer, adhered to the first outer layer, comprising a material selected from the group consisting of:

i) anhydride functionalized polyolefin, ii) ethylene/vinyl acetate copolymer having a vinyl acetate content of between 10% and 35% by weight of the ethylene/vinyl acetate copolymer, iii) ethylene/alkyl acrylate copolymer having an alkyl acrylate content of between 10% and 30% by weight of the ethylene/alkyl acrylate copolymer, iv) ethylene/alkyl methacrylate copolymer having an alkyl methacrylate content of between 10% and 30% by weight of the ethylene/alkyl methacrylate copolymer, v) ethylene/acrylic acid copolymer having an acrylic acid content of between 10% and 30% by weight of the ethylene/acrylic acid copolymer, vi) ethylene/methacrylic acid copolymer having a methacrylic acid content of between 10% and 30% by weight of the ethylene/methacrylic acid copolymer, and vii) ionomer.

7. The film of claim 5 wherein the polyolefin is a material selected from the group consisting of:

a) ethylene/alpha-olefin copolymer, b) propylene/ethylene copolymer, c) ethylene/vinyl acetate copolymer, and d) ionomer.

8. The film of claim 7 wherein the ethylene/alpha-olefin copolymer comprises a material selected from the group consisting of:

a) linear medium density polyethylene, b) linear low density polyethylene, c) very low density polyethylene, and d) homogeneous ethylene/alpha olefin copolymer.

9. The film of claim 8 wherein the homogeneous ethylene/alpha olefin copolymer comprises metallocene catalyzed ethylene/alpha olefin copolymer.

10. The film of claim 5 wherein the film is crosslinked.

11. A heat shrinkable multilayer film comprising:

a) a core layer, having two major surfaces, comprising polyvinyl chloride;

b) two intermediate layers, each adhered to a respective major surface of the core layer, comprising a material selected from the group consisting of i) anhydride functionalized polyolefin, ii) ethylene/vinyl acetate copolymer having a vinyl acetate content of between 10% and 35% by weight of the ethylene/vinyl acetate copolymer, iii) ethylene/alkyl acrylate copolymer having an alkyl acrylate content of between 10% and 30% by weight of the ethylene/alkyl acrylate copolymer, iv) ethylene/alkyl methacrylate copolymer having an alkyl methacrylate content of between 10% and 30% by weight of the ethylene/alkyl methacrylate copolymer, v) ethylene/acrylic acid copolymer having an acrylic acid content of between 10% and 30% by weight of the ethylene/acrylic acid copolymer, vi) ethylene/methacrylic acid copolymer having a methacrylic acid content of between 10% and 30% by weight of the ethylene/methacrylic acid copolymer, and vii) ionomer; and c) two outer layers, each adhered to a major surface of a respective intermediate layer, comprising a polyolefin;

wherein the film has a shrink tension of between 100 and 300 psi in at least one of the machine and transverse directions at 200° F., and a free shrink of between 25% and 55% in at least one of the machine and transverse directions at 220° F.

12. The film of claim 11 wherein the polyolefin is a material selected from the group consisting of:

a) ethylene/alpha-olefin copolymer, b) propylene/ethylene copolymer, c) ethylene/vinyl acetate copolymer, and d) ionomer.

13. The film of claim 12 wherein the ethylene/alpha-olefin copolymer comprises a material selected from the group consisting of:

a) linear medium density polyethylene, b) linear low density polyethylene, c) very low density polyethylene, and d) homogeneous ethylene/alpha olefin copolymer.

14. The film of claim 13 wherein the homogeneous ethylene/alpha olefin copolymer comprises metallocene catalyzed ethylene/alpha olefin copolymer.

15. The film of claim 11 wherein the film is crosslinked.

16. A heat shrinkable multilayer film comprising a) a first layer, having two major surfaces, comprising polyvinyl chloride; and b) a second layer, adhered to a first major surface of the first layer, comprising a material selected from the group consisting of:

i) anhydride functionalized polyolefin, ii) ethylene/vinyl acetate copolymer having a vinyl acetate content of between 10% and 35% by weight of the ethylene/vinyl acetate copolymer, iii) ethylene/alkyl acrylate copolymer having an alkyl acrylate content of between 10% and 30% by weight of the ethylene/alkyl acrylate copolymer, iv) ethylene/alkyl methacrylate copolymer having an alkyl methacrylate content of between 10% and 30% by weight of the ethylene/alkyl methacrylate copolymer, v) ethylene/acrylic acid copolymer having an acrylic acid content of between 10% and 30% by weight of the ethylene/acrylic acid copolymer, vi) ethylene/methacrylic acid copolymer having a methacrylic acid content of between 10% and 30% by weight of the ethylene methacrylic acid copolymer, and vii) ionomer;

wherein the film has an oxygen transmission rate of at least 100 cc/square meter-day-atmosphere in accordance with ASTM D 3985;and wherein the film has a shrink tension of between 100 and 300 psi in at least one of the machine and transverse directions at 200° F., and a free shrink of between 25% and 55% in at least one of the machine and transverse directions at 220° F.

17. A heat shrinkable multilayer film comprising a) a core layer, having two major surfaces, comprising a material selected from the group consisting of:

i) anhydride functionalized polyolefin, ii) ethylene/vinyl acetate copolymer having a vinyl acetate content of between 10% and 35% by weight of the ethylene/vinyl acetate copolymer, iii) ethylene/alkyl acrylate copolymer having an alkyl acrylate content of between 10% and 30% by weight of the ethylene/allyl acrylate copolymer, iv) ethylene/alkyl methacrylate copolymer having an alkyl methacrylate content of between 10% and 30% by weight of the ethylene/alkyl methacrylate copolymer, v) ethylene/acrylic acid copolymer having an acrylic acid content of between 10% and 30% by weight of the ethylene/acrylic acid copolymer, vi) ethylene/methacrylic acid copolymer having a methacrylic acid content of between 10% and 30% by weight of the ethylene/methacrylic acid copolymer, and vii) ionomer;

b) a first outer layer, adhered to a first major surface of the first layer, comprising polyvinyl chloride; and c) a second outer layer, adhered to a second major surface of the first layer, comprising polyolefin or polyvinyl chloride;

wherein the film has an oxygen transmission rate of at least 100 cc/square meter-day-atmosphere in accordance with ASTM D 3985; and wherein the film has a shrink tension of between 100 and 300 psi in at least one of the machine and transverse directions at 200° F., and a free shrink of between 25% and 55% in at least one of the machine and transverse directions at 220° F.

* * * * *